United States Patent
Woude

(10) Patent No.: US 6,834,077 B1
(45) Date of Patent: Dec. 21, 2004

(54) SYSTEM AND METHOD FOR TESTING A MODEM

(75) Inventor: Jeremy Vander Woude, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/457,207

(22) Filed: Dec. 7, 1999

(51) Int. Cl.[7] .................................................. H04B 1/38
(52) U.S. Cl. .................... 375/222; 375/219; 375/224; 375/257; 375/295; 375/316; 702/182; 702/188
(58) Field of Search ................................ 375/219, 220, 375/221, 222, 224, 257, 295, 316; 702/182, 188, 183, 185, 186

(56) References Cited

U.S. PATENT DOCUMENTS 5,764,694 A * 6/1998 Rahamim et al. ........... 375/224
6,195,414 B1 * 2/2001 Simmons et al. ........... 375/225
6,307,877 B1 * 10/2001 Philips et al. ............... 375/130
6,311,291 B1 * 10/2001 Barrett, Sr. .................. 379/222
6,560,557 B1 * 5/2003 Carnahan et al. ........... 702/122

OTHER PUBLICATIONS http://www.consultronics.on.ca. http://www.consultronics.on.ca/puma_4000a_series_typical_setups.htm.*

* cited by examiner

Primary Examiner—Mohammed Ghayour
Assistant Examiner—Pankaj Kumar
(74) Attorney, Agent, or Firm—Knobbe Martens Olson & Bear LLP

(57) ABSTRACT

A system and method for testing a modem in a personal computer are described. A modem tester includes a signal reporting circuit which can report signals received from the modem of the computer. To test the operation of the modem in the computer, test data can be sent from the modem tester to the modem in the computer and test data can be received by the modem tester when transmitted from the modem in the computer.

8 Claims, 2 Drawing Sheets

SYSTEM AND METHOD FOR TESTING A MODEM

BACKGROUND OF THE INVENTION

1. Field of the Invention

This invention relates generally to the testing of communication devices and has particular application in the testing of an internal modem on a personal computer.

2. Description of the Related Art

More and more personal computers, including laptop and desktop models, include modems as standard equipment. With the ever expanding use of the Internet, a modem is becoming a standard accessory for a personal computer. A modem can be used, for example, to transmit and receive information over telephone lines and other communication lines. It would be useful to have a simple portable device which could be used, for example, as part of production quality control testing and/or field testing of modems which are parts of personal computers.

SUMMARY OF THE INVENTION

The present invention provides a system and method for testing a modem.

One aspect of the invention is directed to a device for testing the operation of a modem in a computer. The device includes a case with a first communication port attached to the case. A signal reporting circuit is located within the case and coupled to the first communication port. The signal reporting circuit is configured to test the transmit capability of the modem in the computer.

Another aspect of the invention is a method of testing the operation of a modem in a computer using a portable modem testing device. The method includes coupling the modem in the computer to the portable modem testing device and then initiating transmission of test data from the modem with the test data then being received at the portable modem testing device. The transmission is then verified.

In another aspect of the method, the computer is further coupled to the portable modem testing device via an alternate communication link. After the portable modem testing device has received the transmission from the modem, the portable modem testing device transmits a signal to the computer via the alternate communication link.

Another aspect of the invention is directed to a method of testing the operation of a modem in a computer using a portable modem testing device directed to the receive function of the modem. The modem in the computer is first coupled to the portable modem testing device. Transmission of test data from the portable modem testing device is then initiated. The transmission is received at the modem and the transmission is verified.

In another aspect of the method, the computer is coupled to the portable modem testing device via an alternate communication link. After the modem has received the transmission from the portable modem testing device, a signal is transmitted from the computer to the portable modem testing device via the alternate communication link.

These and other features of the invention will become more fully apparent from the following description and appended claims taken in conjunction with the accompanying drawings.

DETAILED DESCRIPTION OF THE PREFERRED EMBODIMENT

Figure 1:
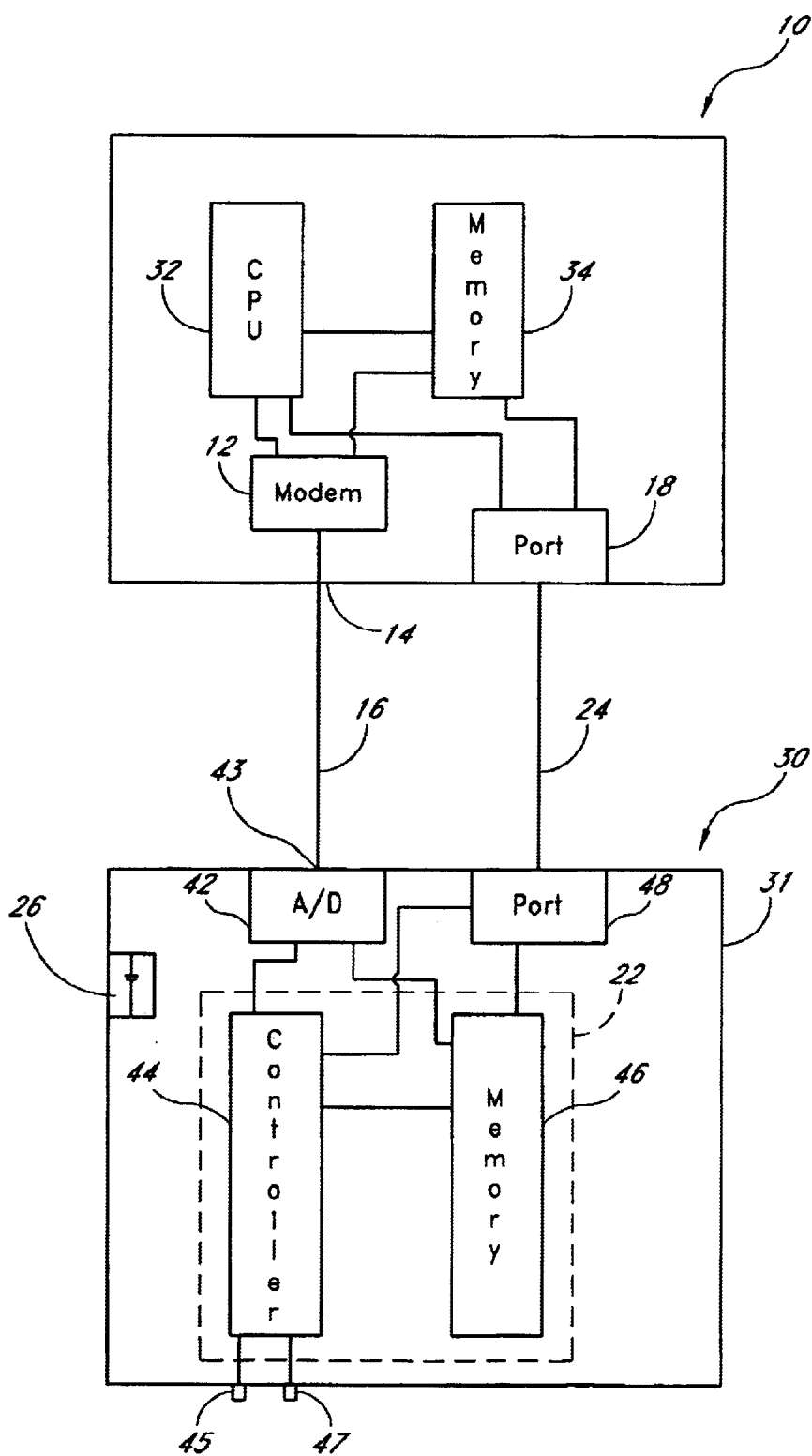
FIG. 1 is a block diagram of a personal computer and a modem tester in accordance with aspects of the present invention.

FIG. 1 is a block diagram depicting a computer 10 and a modem tester 30. The computer can be a personal computer such as a laptop or a desktop computer. The computer 10 includes a central processing unit 32, a memory 34 and an internal modem 12. The modem provides the capability to modulate and demodulate signals. The modem 12 is typically used to communicate over telephone lines. The modem also includes an input/output modem port 14 such as an RJ11 connector or jack. The RJ11 jack can receive a typical RJ11 plug. An alternate communications port 18, such as an RS232 serial port, is also present on the computer 10.

The modem tester 30 includes an outer case 31 and is shown coupled to the computer 10 via the modem port 14 of the computer 10. The communication can be accomplished via a cable 16 such as a typical telephone cable. Additionally, the modem tester 20 is also connected to the computer 10 via the alternate port 18 of the computer 10 using an appropriate cable 24. This arrangement provides two communication links between the computer 10 and the modem tester 30.

The modem tester 30 can include a signal reporting circuit 22 which reports the signals received from the computer 10 via the modem communication line 16 back to the computer 10 via the alternate port 18. An electrical power source 26 is also included in the modem tester 30. The power source can be a battery or power can be provided by an external electrical power supply such as a typical electrical outlet.

The modem tester 30 includes an analog to digital converter 42 which is coupled to a first communication port 43 which can be attached to the case 31 so as to be easily accessible. The first port 43 can be, for example, an RJ11 jack. Alternatively, the modem tester can include a modem having an analog to digital converter. A controller 44, such as a microprocessor 44 and a memory 46, form the reporting circuit 22. The microprocessor 44 and the memory 46 are coupled to the analog to digital converter and to a port 48. Port 48 can be, for example, an RS232 serial port.

When in use, the modem 12 of the computer 10 is coupled to the analog to digital converter 42 via the connector 16 for the transmission of the electrical signals between the modem 30 and the analog to digital converter 12. Additionally, the serial port 18 of the computer 10 is coupled to the serial port 48 of the modem tester 30 via a connector 51.

Signals received over the connection 16 from the modem 12 by the analog to digital converter 42 are converted from an analog to a digital form and then stored in the memory 46. In addition, data stored in the memory 46 can be transmitted by the serial port 48 over the connection 24 to the serial port 18 of the computer 10. Both the port 18 and the port 48 can be serial ports, parallel ports or any other communication ports which will allow the communication of data between the computer 10 and the modem tester 30.

An input device 45, such as a contact switch, is provided on the outside of the modem tester 40 to receive input from a user. The input device 45 can be used, for example, to initiate a transmit test. Similarly, a second input device 47 can be provided on the outside of the modem tester so as to be accessible to a user. The second input device 47 can be used to initiate a second test such as a receive test. Alternatively, other types of input devices known to those of ordinary skill in the art could be used to carry out these functions.

The memory 34 of the computer 10 can be used to store a program which causes the central processing unit 32 to perform the steps of a modem testing routine. Similarly, the memory 46 of the modem tester 30 can also store a software program which can cause the controller 44 to execute a reciprocal portion of a testing routine.

Figure 2:
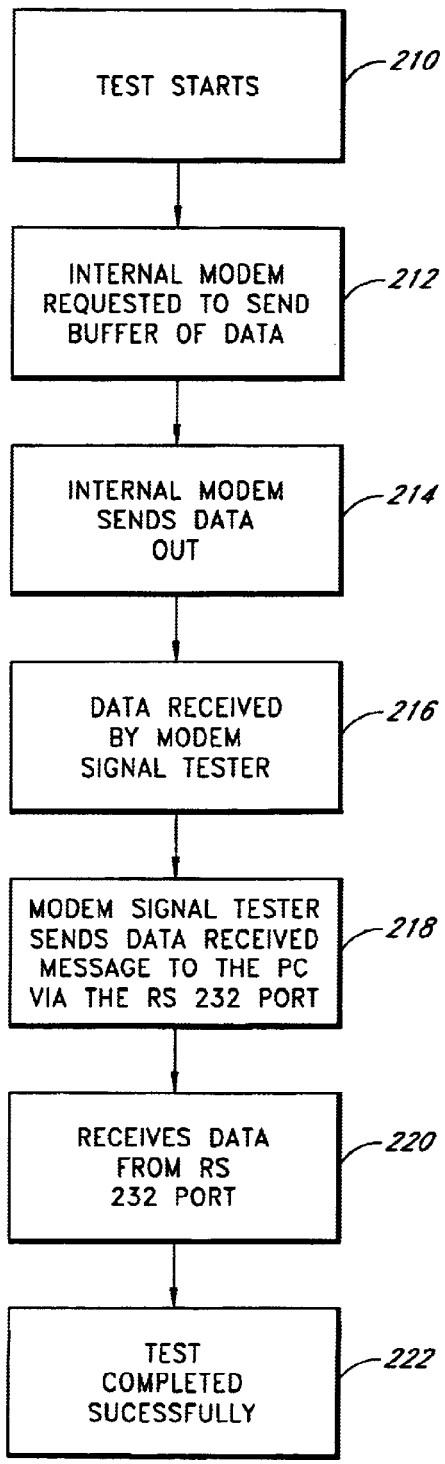
FIG. 2 is a flow chart of an output test.

FIG. 2 is a flowchart which represents a sequence of operations or steps performed to test the output or transmit capability of a modem in a computer such as personal computer 10 depicted in FIG. 1. As will be apparent to those of ordinary skill in the art, the steps of the test can be carried out utilizing software stored in the memories of both the modem tester 30 and the computer 10. Alternatively, control of the sequence of operations or implementation of the steps can be under the control of a program residing entirely and running entirely on either the modem tester 30 or the computer 10.

Referring to FIG. 2, at a state 210 the test is initiated. For example, the test can be initiated by an operator using the input device 45. The modem tester 30 then sends a signal via connection 24 or connection 16 to the computer indicating that the test is initiated. Alternatively, the test can be initiated by input provided to the computer. Prior to the test being initiated, connections 16 and 24 between the modem tester 30 and the computer 10 (see FIG. 1) should be in place in order to allow communication between the two devices.

At a state 212 the modem 12 of the computer is instructed by the central processing unit 32 to transmit a buffer of test data. Test data can be stored in the memory 34 of the computer 10. Alternatively, the test data can be transmitted to the computer 10 from the modem tester 30 via connection 16 or connection 24.

At a state 214 the modem 12 transmits the test data over connection 16 to the analog to digital converter 42 of the modem tester 30. At a state 216, the analog to digital converter 42 receives the data in the form of an analog signal and converts the analog signal back into digital data. That data is stored in the memory 46. Alternatively, the data from the analog to digital converter 42 can be sent directly to port 48 to be transmitted over connection 24 to the port 18 of the computer 10, thereby reducing the need for memory 46 and microprocessor 44 in the tester 30.

At a state 218 the data stored in memory 46 is transmitted to the computer 10 via port 48 over connection 24 under the control of microprocessor 44. At a state 220 port 18 of the computer receives that data which is then stored in memory 34. At a state 222 the computer 10 compares the data received with the original data that was transmitted in order to confirm that the transmission was successful.

Alternatively, after the modem tester 30 receives the data from the modem 12, the modem tester 30 can compare the receive data against a known data set to determine that the transmission was successful. That arrangement would eliminate the need for the connection 24.

Figure 3:
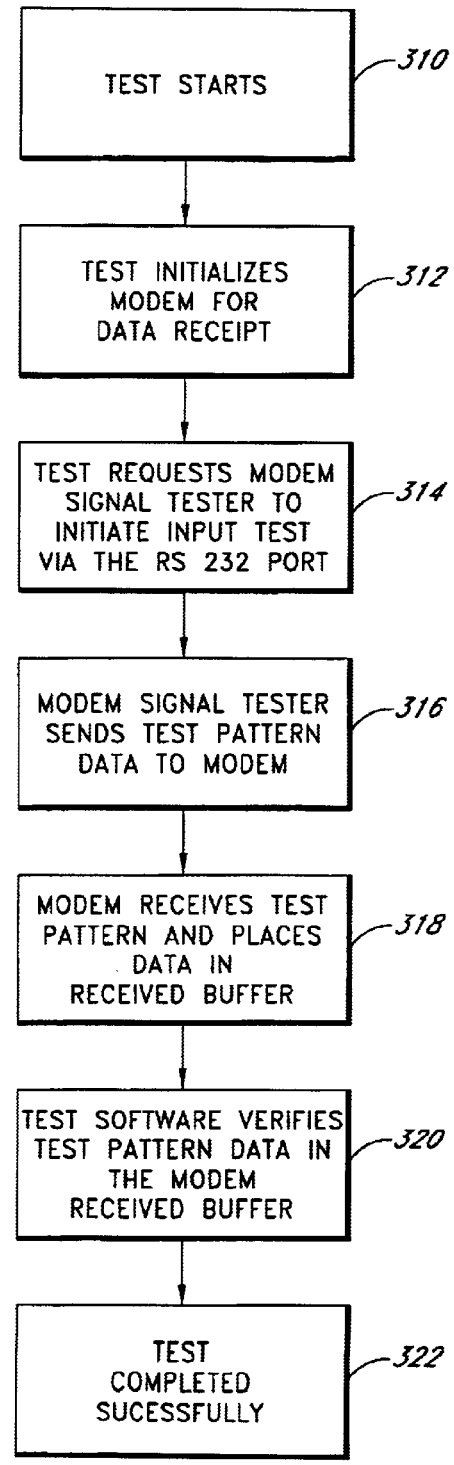
FIG. 3 is a flowchart of an input test.

FIG. 3 is a flow chart which represents the sequence of steps or operations performed to test the input or receive capability of a modem in a computer such as personal computer 10 depicted in FIG. 1. As will be apparent to those of ordinary skill in the art, the steps or process of the test can be carried out utilizing software stored in the memories of both the modem tester 30 and the computer 10. Alternatively, control of the sequence of operation can be under the control of the program residing and running entirely on either the modem tester 30 or the computer 10.

Referring to FIG. 3, at a state 310 the test is initiated. For example, the test can be initiated by an operator using the input device 47. The modem tester 30 then sends a signal via a connection 24 or connection 16 to the computer 10 indicating that the test is initiated. Alternatively, the test can be initiated by input provided directly to the computer 10. Prior to the test being initiated, connections 16 and 24 between the modem tester 30 and the computer 10 (see FIG. 1) need to be in place in order to allow communications between the two devices.

At a state 312 the modem 12 is initialized to receive data. For example, the CPU 32 can send a command to the modem 12. At a state 314 the computer 10 sends a signal to the modem tester 30 indicating that the modem 12 has been initialized to receive a transmission. For example, the CPU can send a signal via connection 24.

At a state 316 the modem tester 30 transmits test data via connection 16 to the modem 12. At a state 318 the modem 12 receives the test data and stores that data. The data can be stored in an internal buffer of the modem 12 or can be stored in the memory 34 of the computer 10.

At a state 320 the test data received by the modem is verified as accurate. This can be accomplished by the computer 10 having an identical set of the test data. Alternatively, the receive data can be transmitted to the modem tester 30 via connection 24 and a comparison can take place in the modem tester 34. When the test data received by the modem is verified to be accurate, as represented by a state 322, the test has been completed successfully.

The invention may be embodied in other specific forms without departing from its spirit or essential characteristics. The described embodiments are to be considered in all respects only as a illustrative and not restrictive. The scope of the invention is indicated by the appended claims rather than by the foregoing description. All changes which come within the meaning and range of equivalency of the claims are to be embraced within their scope.

What is claimed is:

1. A method of testing the method comprising:
    coupling a modem in a computer to a portable modem testing device via a first communication link;
    coupling the computer to the portable modem testing device via an alternate communication link that bypasses the modem, wherein the first and alternate communication links provide separate paths to the computer;
    sending a signal from the portable modem testing device to the computer via the alternate communication link to initiate testing the operation of the modem in the computer;
    initiating transmission of test data from the modem;
    receiving the transmission from the modem at the portable modem testing device; and
    verifying the transmission, wherein verifying the transmission further comprises:
        receiving a second transmission of the test data via the alternate communication link; and
        comparing the transmission of the test data with the second transmission of the test data.

2. A method of testing, the method comprising:
    coupling a modem in a computer to a modem testing device via a first communication link;
    coupling the computer to the modem testing device via an alternate communication link that bypasses the modem, wherein the first and alternate communication links provide separate paths to the computer;

sending a signal to the computer via the alternate communication link to initialize the modem in the computer;

transmitting of test data from the modem testing device;

receiving the transmission from the modem testing device at the modem in the computer;

verifying the transmission;

transmitting test data from the modem to the modem testing device; and verifying the test data, wherein verifying the test data comprises comparing the test data received from the modem with the test data transmitted by the modem testing device.

3. A method of testing, the method comprising:

coupling a modem in a computer to a modem testing device via a first communication link;

coupling the computer to the modem testing device via an alternate communication link that bypasses the modem, wherein the first and alternate communication links provide separate paths to the computer;

sending a signal to the computer via the alternate communication link to initialize the modem in the computer;

transmitting of test data from the modem testing device;

receiving the transmission from the modem testing device at the modem in the computer;

verifying the transmission;

transmitting test data from the modem to the modem testing device; and verifying the test data, wherein verifying the transmission from the modem testing device comprises comparing the transmitted test data with a known data set.

4. The method of claim 3, wherein the known data set is transmitted to the computer via the alternate communication link.

5. A method of testing, the method comprising:

coupling a modem in a computer to a portable modem testing device;

coupling the computer to the portable modem testing device via an alternate communication link that bypasses the modem;

sending a signal from the portable modem testing device to the computer via the alternate communication link to initiate testing the operation of the modem in the computer;

initiating transmission of test data from the modem;

receiving the transmission from the modem at the portable modem testing device; and verifying the transmission, wherein verifying the transmission further comprises:
  receiving a second transmission of the test data via the alternate communication link; and
  comparing the transmission of the test data with the second transmission of the test data.

6. A method of testing, the method comprising:

coupling a modem in a computer to a modem testing device;

coupling the computer to the modem testing device via an alternate communication link that bypasses the modem;

sending a signal to the computer via the alternate communication link to initialize the modem in the computer;

transmitting of test data from the modem testing device;

receiving the transmission from the modem testing device at the modem in the computer;

verifying the transmission;

transmitting test data from the modem to the modem testing device; and verifying the test data by comparing the test data received from the modem with the test data transmitted by the modem testing device.

7. A method of testing, the method comprising:

coupling a modem in a computer to a modem testing device;

coupling the computer to the modem testing device via an alternate communication link that bypasses the modem;

sending a signal to the computer via the alternate communication link to initialize the modem in the computer;

transmitting of test data from the modem testing device;

receiving the transmission from the modem testing device at the modem in the computer;

verifying the transmission by comparing the transmitted test data with a known data set;

transmitting test data from the modem to the modem testing device; and verifying the test data.

8. The method of claim 7, wherein the known data set is transmitted to the computer via the alternate communication link.

* * * * *